United States Patent [19]
Uranaka et al.

[11] Patent Number: 6,003,659
[45] Date of Patent: Dec. 21, 1999

[54] TWIN BELT CONVEYOR APPARATUS

[75] Inventors: Masaki Uranaka, Yokohama; Akihiko Yokozi, Kitakyushu, both of Japan

[73] Assignee: Bridgestone Corporation, Tokyo, Japan

[21] Appl. No.: 09/060,547

[22] Filed: Apr. 15, 1998

[30] Foreign Application Priority Data

| Apr. 24, 1997 | [JP] | Japan | 9-122931 |
| Apr. 9, 1998 | [JP] | Japan | 10-97086 |

[51] Int. Cl.$^6$ .................................................. B65G 15/12
[52] U.S. Cl. ..................................... 198/626.1; 198/626.4
[58] Field of Search ........................ 198/606, 607, 198/626.1, 626.2, 626.3, 626.4, 626.5, 626.6

[56] References Cited

U.S. PATENT DOCUMENTS

| 4,161,138 | 7/1979 | Marchetti | 198/626.5 X |
| 4,406,359 | 9/1983 | Cole et al. | 198/626.1 |
| 4,738,351 | 4/1988 | Takehara | 198/626.1 |
| 4,776,451 | 10/1988 | Gaddis . | |
| 4,779,715 | 10/1988 | Pazdernik | 198/626.4 X |
| 5,186,310 | 2/1993 | Winchester | 198/626.5 |

FOREIGN PATENT DOCUMENTS

| 0 251 099 | 1/1988 | European Pat. Off. . | |
| 0832117 | 2/1952 | Germany | 198/626.1 |
| 0123805 | 9/1980 | Japan | 198/626.1 |
| 0325546 | 2/1930 | United Kingdom | 198/626.1 |

*Primary Examiner*—James R. Bidwell
*Attorney, Agent, or Firm*—Graham & James LLP

[57] ABSTRACT

There are provided two flat belts which rotate in opposite directions. Between the two belts, materials are put and conveyed upwards. A head pulley around which one of the belts is wound is driven by a motor, and another head pulley around which the other of the belts is wound is connected to the head pulley driven by the motor via sprockets, an endless chain, a shaft and two gears. The two belts are driven and rotated by the same motor, thereby simplifying its structure.

12 Claims, 4 Drawing Sheets

PRIOR ART

TWIN BELT CONVEYOR APPARATUS

BACKGROUND OF THE INVENTION

The present invention relates to a twin belt conveyor apparatus which comprises a pair of flat belts each of which rotates endlessly in opposite directions, materials being put and conveyed between the belts which run in the same direction.

In a belt conveyor having a large lift and a high transportation rate for transferring excavated earth, iron ore or aggregates, a main conveyor belt and an auxiliary belt are provided. Materials are thrown onto the main belt, and covered with the auxiliary belt. The materials are conveyed by driving both the belts.

FIG. 7 denotes a view which shows all of a conveyor apparatus, in which 31 denotes a main flat belt which is wound between a head pulley 32 and a tail pulley 33. The head pulley 32 is connected to drive means, and materials are put from a hopper 34 onto the lower end of the main belt 31 for conveying. An auxiliary belt 35 comprises a flat belt with which the materials on the main belt 31 are covered, and is wound between a head pulley 36 and a tail pulley 37. The auxiliary belt 35 is rotated along the main belt 31 by drive means connected to the head pulley 36.

FIG. 8 is a top plan view of the head pulleys 32 and 36 of the main and auxiliary belts 31 and 35. To one end of the head pulley 32, an output shaft of a reduction gear 42 connected to a motor 43 is connected via a shaft coupling 41. The head pulley 36 of the auxiliary belt 35 is connected via a shaft coupling 44 to a reduction gear 45 connected to a motor 46.

In an apparatus in which the main and auxiliary belts 31 and 35 are driven by each of the motors 43 and 46, the head pulleys 32 and 36 which comprise drive pulleys become different in rotation speed, depending on the features of the motors 43 and 46, difference on load between the main and auxiliary belts 31 and 35, difference in feed of the motors involved by the load and errors in reduction gear ratio of the reduction gears 42 and 45. The difference in rotation speed between the main and auxiliary belts 31 and 35 becomes difference in running speed between them. Thus, during operation of the conveyors, the belts are always rubbed together, thereby increasing wear and generating noise.

In a steep slope conveyor apparatus, the drive pulleys for the main and auxiliary belts 31 and 35 are very different in installation height, and thus, it is necessary to provide drive means and supporting means therefor separately. It increases costs of two drive means and high noise makes environment worse.

SUMMARY OF THE INVENTION

In view of the disadvantages in the prior art, it is an object of the present invention to provide a conveyor apparatus in which a pair of flat belts are driven by a single drive means.

According to one aspect of the present invention, there is provided a twin belt conveyor apparatus which comprises:

a first flat belt which is wound between first drive and driven pulleys to rotate;

a second flat belt which is wound between second drive and driven pulleys to rotate in an opposite direction to that of the first flat belt, said second flat belt being overlapped over the first flat belt to convey materials between the first and second flat belts;

a single drive means for driving one of the first and second drive pulleys; and power transmitting means for connecting the first drive pulley to the second drive pulley so that the second drive pulley may rotate in an opposite direction to that of the first drive pulley.

According to another aspect of the present invention, there is provided a twin belt conveyor apparatus which comprises:

a first flat belt which is wound between first drive and driven pulleys to rotate;

a second flat belt which is wound between second drive and driven pulleys to rotate in an opposite direction to that of the first flat belt, said second flat belt being overlapped over the first flat belt to convey materials between the first and second flat belts;

a single drive means; and means for rotating the first drive pulley in a normal direction and the second drive pulley in an opposite direction, said means for rotating the first pulley being joined to said single drive means.

According to the present invention, the first and second flat belts which are rotated in opposite directions to each other are driven by a single drive means, thereby simplifying its structure and decreasing costs of manufacturing. Synchronization between the first and second belts can be easily made, thereby decreasing wear generated friction between the first and second flat belts.

BRIEF DESCRIPTION OF THE DRAWINGS

The features and advantages of the present invention will become more apparent from the following description with respect to embodiments as shown in accompanying drawings wherein.

DETAILED DESCRIPTION OF PREFERRED EMBODIMENTS

Figure 1:
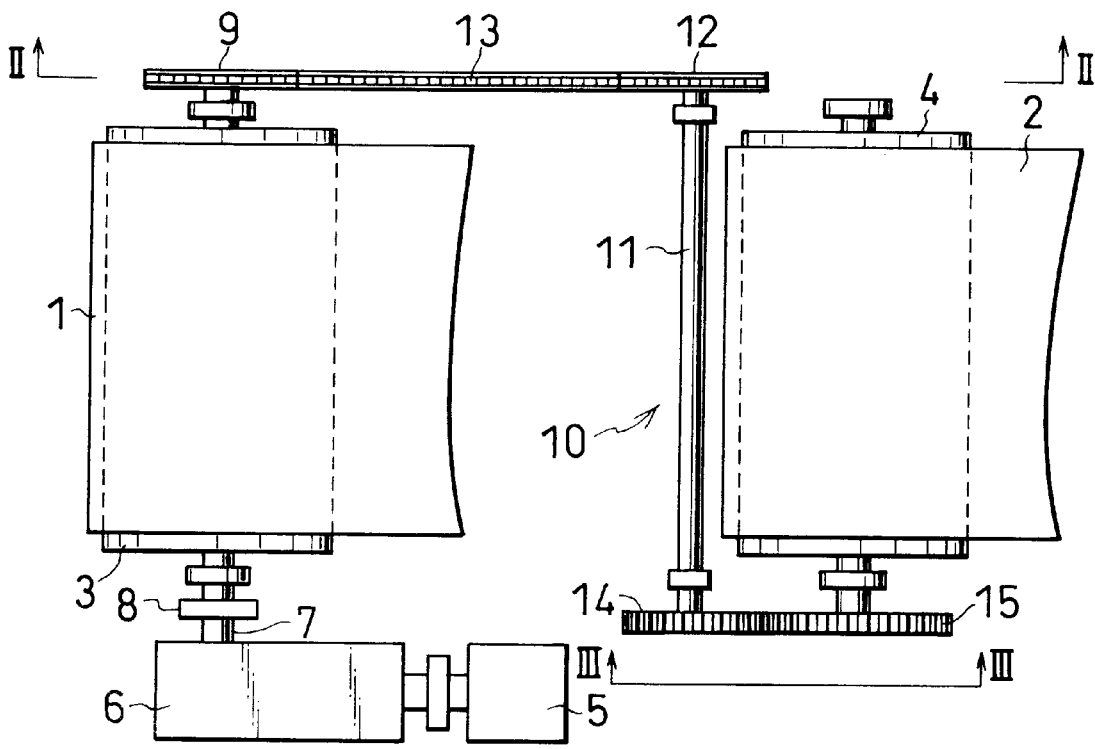
FIG. 1 is a top plan view of the first embodiment of the present invention.
Figure 2:
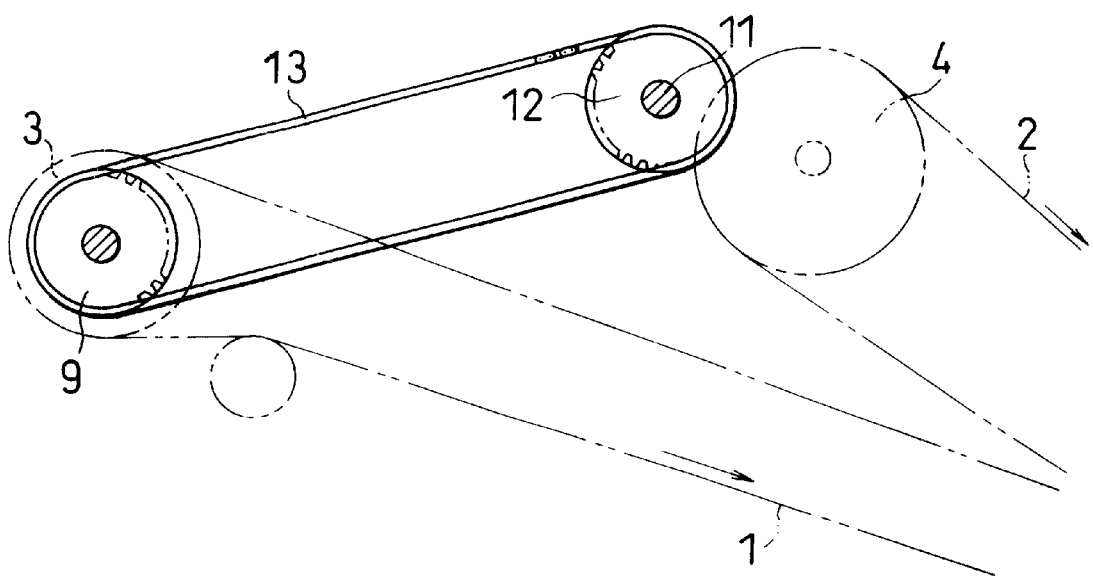
FIG. 2 is a vertical sectional view taken along the line II—II in FIG. 1.
Figure 3:
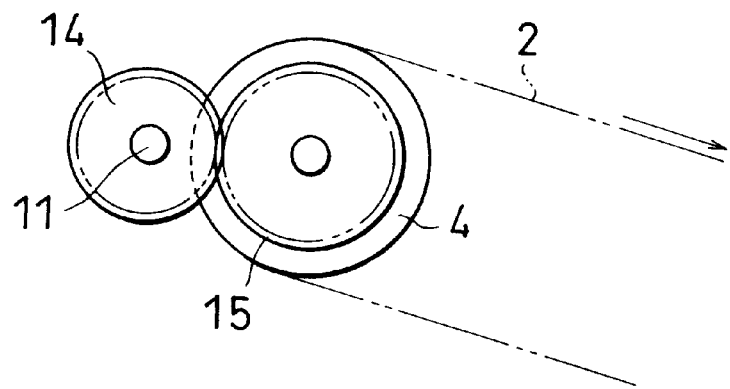
FIG. 3 is a view seen from arrows III—III in FIG. 1.

FIGS. 1 to 3 illustrate the first embodiment of the present invention.

The numeral 1 denotes a main flat belt, and 2 denotes an auxiliary flat belt. Both the belts 1 and 2 are wound around head pulleys 3 and 4 and tail pulleys (not shown), and are rotated endlessly. Materials are thrown onto the main belt 1 at the lower end from a hopper and conveyed between the upper surface of the main belt 1 and the lower surface of the auxiliary belt 2. One end of the head pulley 3 is connected via a shaft coupling 8 to an output shaft 7 of a reduction gear 6 driven by a motor 5.

At the other end of the head pulley 3, a sprocket 9 is mounted to the output shaft 7 of the head pulley 3.

The numeral 10 denotes a gear mechanism which comprises an intermediate shaft 11 in parallel with the head pulley 4; a sprocket 12 fixed to one end of the intermediate shaft 11 and placed in the same vertical plane as the sprocket 9, an endless chain 13 wound around the sprockets 9 and 12; a reverse gear 14 which comprises a spur gear fixed to the other end of the intermediate shaft 11; and a spur gear 15 at one end of the head pulley 4 to rotate together with the head pulley 4, the spur gear 15 being engaged with the reverse gear 14.

The gear mechanism 10, the endless chain 13 and the sprocket 9 constitute power transmitting means for connecting the head pulleys 3 and 4 which are rotated in opposite directions at speed rate of 1.

In the first embodiment, the head pulley 3 or drive pulley for the main belt 1 is rotated by a single drive means, and the head pulley 4 or drive pulley for the auxiliary belt 2 is rotated in an opposite direction to that of the head pulley 3 at the same speed via the power transmitting means.

Thus, the main and auxiliary belts 1 and 2 are rotated in opposite directions at the same speed, and at overlapped portion, there is no difference in speed, thereby reducing friction between the belts 1 and 2 and decreasing wear.

Figure 4:
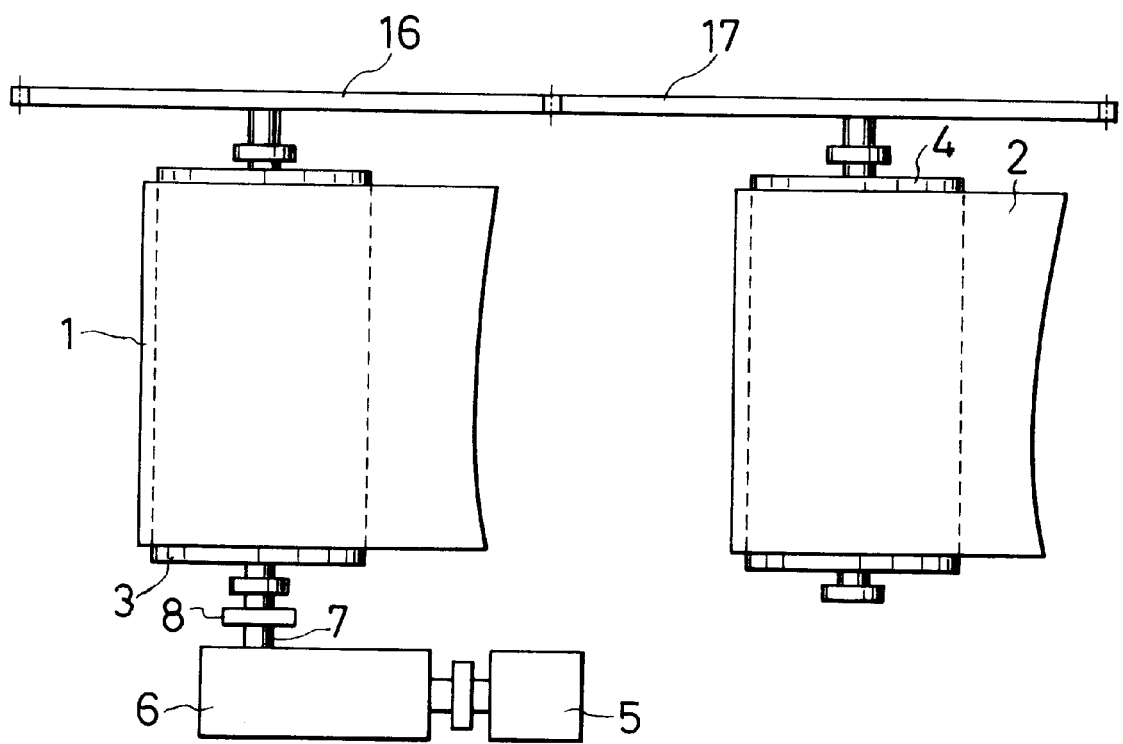
FIG. 4 is a top plan view which shows variation of power transmitting means, similar to FIG. 1.

FIG. 4 denotes another embodiment of the power transmitting means, in which there are provided spur gears 16 and 17 having the same number of teeth so that the head pulley 1 may be rotated together with the head pulley 2 in opposite directions. The other elements are similar to what is shown in FIG. 1. Such structure not only can achieve the same function and advantage as what is shown in the first embodiment, but also can simplify the structure of power transmitting means.

Between the spur gears 16 and 17, the even numbers of idle gears may be inserted, thereby decreasing the sizes of the spur gears 16 and 17.

The power transmitting means may comprise a crossed endless chain or belt between a pair of sprockets or pulleys which rotate with the head pulleys respectively.

One of tail pulleys of the main and auxiliary belts 1 and 2 may be a drive pulley which is driven by drive means which comprises a motor 5 and a reduction gear 6, and both the tail pulleys may be connected by power transmitting means to carry out the invention.

Figure 5:
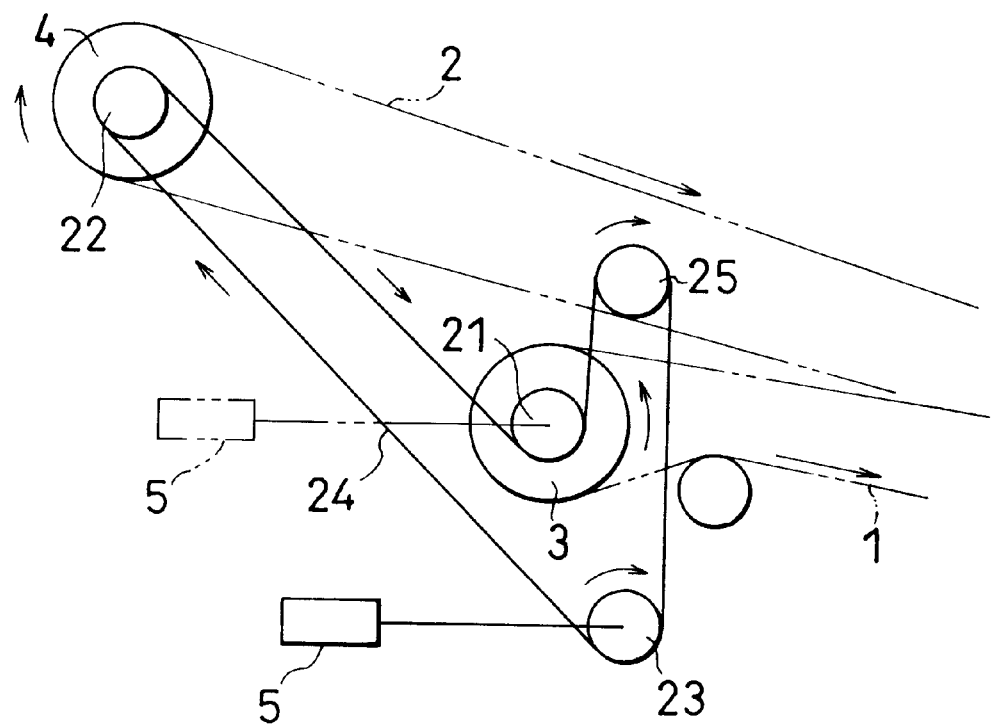
FIG. 5 is a schematic side view of the second embodiment according to the present invention.

FIG. 5 shows the second embodiment of the present invention. In the embodiment, driven sprockets 21 and 22 are provided at one ends of a head pulley 3 for driving a main belt 1 and of a head pulley 4 for driving an auxiliary belt 2 respectively so as to rotate coaxially with the pulleys 3 and 4. A drive sprocket 23 which is pivoted at a frame (not shown) below a driven sprocket 21 is rotated by a motor 5, and an endless chain 24 is wound around the drive sprocket 23 and a guide sprocket 25. The driven sprockets 21 and 22 are wound to rotate in opposite directions, and the drive sprocket 23 is rotated in a clockwise direction as shown by an arrow in FIG. 5, so that the driven sprocket 21 and the head pulley 3 of the main belt 1 is rotated in an anticlockwise direction, and the driven sprocket 22 and the head pulley 4 for the auxiliary sprocket 2 are rotated in a clockwise direction.

Accordingly, the driven sprockets 21 and 22, the drive sprocket 23, the endless chain 24 and the motor 5 constitute twin drive means.

According to the second embodiment, similar to the first embodiment, the main and auxiliary belts 1 and 2 are driven by the single motor 5 and the structure is simplified.

In the embodiment as shown in FIG. 5, instead of rotation of the drive sprocket 23 by the motor 5, the sprocket 23 may be merely a guide sprocket, and the head pulley 3 of the main pulley 1 is rotated by a motor 5 as shown by a two-dotted line in FIG. 5, so that the sprockets 21 and 22, the guide sprocket 23 and the endless chain 24 constitute power transmitting means similar to that in the first embodiment.

Figure 6:
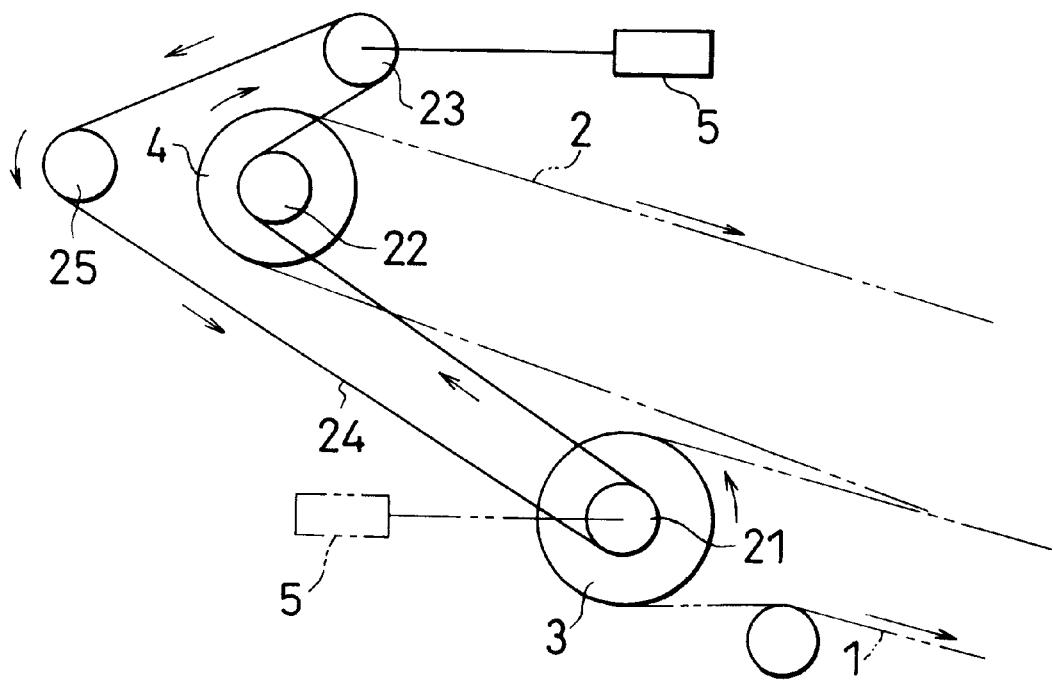
FIG. 6 is a schematic side view of variation of the second embodiment and similar to FIG. 5.
Figure 7:
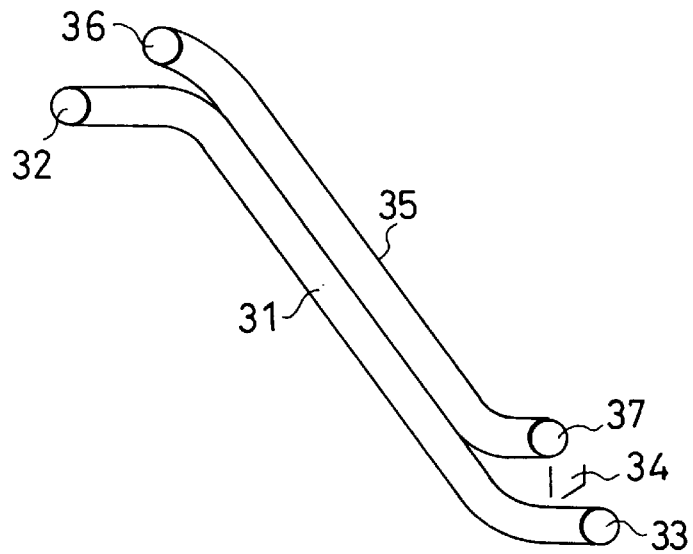
FIG. 7 is a schematic side view which shows a conventional twin belt conveyor apparatus.
Figure 8:
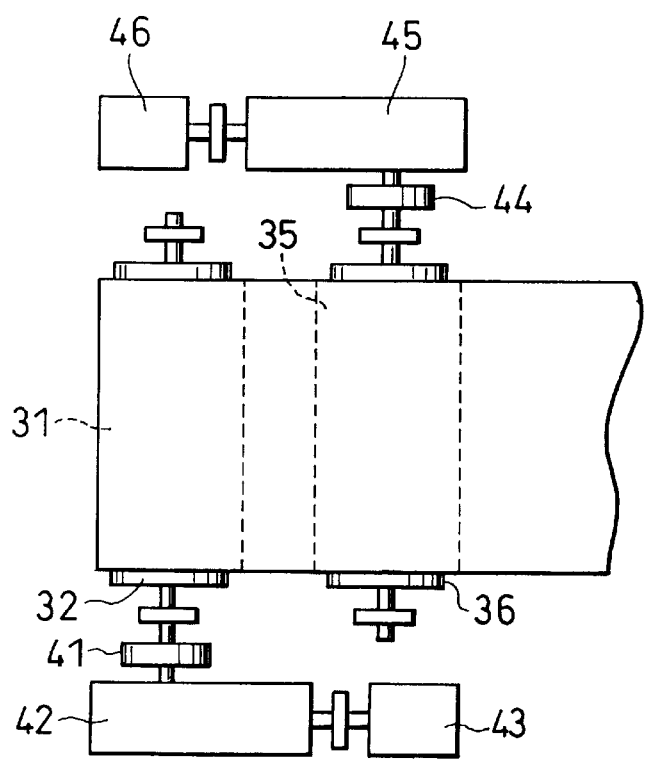
FIG. 8 is a top plan view of the main part.

FIG. 6 shows a variation of the second embodiment of the power transmitting means.

In this embodiment, a drive sprocket 23 driven by a motor 5 is provided above a head pulley 4 for an auxiliary belt 2. A guide sprocket 25 is provided in front of the head sprocket 4. Similar advantage to the second embodiment can be achieved.

In the embodiment as shown in FIG. 6, instead of rotation of the drive sprocket 23 by the motor 5, the sprocket 23 may be merely a guide sprocket, and a head pulley 3 for the main belt 1 may be rotated by a motor 5 as shown in a two-dotted line in FIG. 6, so that the driven sprocket 21 and 22, the guide sprocket 23 and the endless chain 24 constitute power transmitting means similar to that in the first embodiment.

The foregoings merely relate to embodiments of the present invention. Various modifications and changes may be made by persons skilled in the art without departing from the scope of claims wherein:

What is claimed is:

1. A twin belt conveyor apparatus comprising:
    a first flat belt which is wound between a first drive pulley and a first driven pulley to rotate;
    a second flat belt which is wound between a second drive pulley and a second driven pulley to rotate in an opposite direction to that of the first flat belt, said second flat belt being overlapped over the first flat belt to convey materials between the first and second flat belts;
    a single drive means for driving one of the first or second drive pulley; and
    power transmitting means for connecting the first drive pulley to the second drive pulley so that the second drive pulley may rotate in an opposite direction to that of the first drive pulley, wherein the power transmitting means comprises a first sprocket joined to the first drive pulley, a second sprocket, an endless chain wound between the first and second sprockets, a first spur gear, a second spur gear engaged with the first spur gear and joined to the second drive pulley, and an intermediate shaft joined between the second sprocket and the first spur gear so that said intermediate shaft is perpendicular to the first drive pulley and the second drive pulley.

2. A twin belt conveyor apparatus as defined in claim 1 wherein the drive means comprises a motor which is connected to the first drive pulley.

3. A twin belt conveyor apparatus as defined in claim 2 wherein the motor is connected to the first drive pulley via a reduction gear.

4. A twin belt conveyor apparatus as defined in claim 1 wherein the drive and driven pulleys comprise head and tail pulleys respectively.

5. A twin belt conveyor apparatus as defined in claim 1 wherein the power transmitting means comprises a pair of spur gears which are engaged with each other, said pair of spur gears being coaxially mounted to the first and second drive pulleys respectively.

6. A twin belt conveyor apparatus as defined in claim 1 wherein rotation speed ratio of the first drive pulley to the second drive pulley is 1.

7. A twin belt conveyor apparatus as defined in claim 1 wherein the power transmitting means comprises a pair of sprockets which are joined to the first and second drive pulleys respectively; a guide sprocket and an endless chain which is wound around said pair of sprockets and the guide sprocket so that said pair of sprockets may rotate in opposite directions to each other.

8. A twin belt conveyor apparatus comprising:

a first flat belt which is wound between a first drive pulley and a first driven pulley to rotate;

a second flat belt which is wound between a second drive pulley and a second driven pulley to rotate in an opposite direction to that of the first flat belt, said second flat belt being overlapped over the first flat belt to convey materials between the first and second flat belts;

a single drive means; and means for rotating the first drive pulley in a normal direction and the second drive pulley in an opposite direction, said means for rotating the first pulley being joined to said single drive means, wherein said means for rotating the first pulley comprises a drive sprocket that is driven by the single drive means, a pair of driven sprockets that are mounted to the first pulley and the second drive pulley respectively, a guide sprocket, and an endless chain that is wound around said pair of driven sprockets, said guide sprocket, and said drive sprocket so that said chain enfolds at least one half of the circumference of one of said pair of driven sprockets.

9. A twin belt conveyor apparatus as defined in claim 8 wherein the drive means comprises a motor.

10. A twin belt conveyor apparatus as defined in claim 8 wherein the drive means comprises a motor and a reduction gear.

11. A twin belt conveyor apparatus as defined in claim 8 wherein the drive and driven pulleys comprise head and tail pulleys respectively.

12. A twin belt conveyor apparatus as defined in claim 8 wherein rotation speed ratio of the first drive pulley to the second drive pulley is 1.

* * * * *